US011493070B2

(12) United States Patent
Sabau et al.

(10) Patent No.: US 11,493,070 B2
(45) Date of Patent: Nov. 8, 2022

(54) LASER NANOSTRUCTURED SURFACE PREPARATION FOR JOINING MATERIALS

(71) Applicant: UT-BATTELLE, LLC, Oak Ridge, TN (US)

(72) Inventors: Adrian Stefan Sabau, Knoxville, TN (US); Charles David Warren, Knoxville, TN (US); Claus Daniel, Knoxville, TN (US); Jian Chen, Suzhou (CN); Donald L. Erdman, III, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 1051 days.

(21) Appl. No.: 16/140,070

(22) Filed: Sep. 24, 2018

(65) Prior Publication Data
US 2019/0024689 A1 Jan. 24, 2019

Related U.S. Application Data

(62) Division of application No. 14/733,395, filed on Jun. 8, 2015, now Pat. No. 10,082,166.
(Continued)

(51) Int. Cl.
*F16B 11/00* (2006.01)
*B29C 65/48* (2006.01)
(Continued)

(52) U.S. Cl.
CPC ........ *F16B 11/006* (2013.01); *B23K 26/0006* (2013.01); *B23K 26/0622* (2015.10);
(Continued)

(58) Field of Classification Search
CPC .............. B29C 2791/009; B29C 65/48; B29C 65/8215; B29C 66/0246; B29C 66/1122; B29C 66/3032; B29C 66/3034; B29C 66/41; B29C 66/7212; B29C 66/73161; B29C 66/742; B29C 66/7422; B29C 66/74283; B23K 2101/18; B23K 2103/16;
(Continued)

(56) References Cited

U.S. PATENT DOCUMENTS 4,745,018 A   5/1988  Chihara et al.
4,758,307 A   7/1988  Pettigrew et al.
(Continued)

OTHER PUBLICATIONS

Warren et al.: "Laser Abalation Assisted Adhesive Bonding of Automotive Structural Composites." Oak Ridge National Laboratory, United States. Department of Energy. Office of Energy Research, United States. Department of Energy. Office of Scientific and Technical Information. United States. Department of Energy. Office of Energy Research, 1999.
(Continued)

*Primary Examiner* — Philip C Tucker
*Assistant Examiner* — Brian R Slawski
(74) *Attorney, Agent, or Firm* — Fox Rothschild LLP

(57) ABSTRACT

A joined article includes a first component having a laser-treated surface portion and a second component having a laser-treated surface portion. An adhesive joins the first component to the second component at the treated surface portion. A method of making a joined article form components and a system for making joined articles are also disclosed.

7 Claims, 16 Drawing Sheets

Related U.S. Application Data

(60) Provisional application No. 62/132,296, filed on Mar. 12, 2015.

(51) Int. Cl.

| | |
|---|---|
| *B23K 26/00* | (2014.01) |
| *B23K 26/06* | (2014.01) |
| *B23K 26/067* | (2006.01) |
| *B23K 26/08* | (2014.01) |
| *B29C 65/82* | (2006.01) |
| *B29C 65/00* | (2006.01) |
| *C09J 5/02* | (2006.01) |
| *B23K 26/354* | (2014.01) |
| *B23K 26/082* | (2014.01) |
| *B23K 26/0622* | (2014.01) |
| *B23K 26/352* | (2014.01) |
| *B32B 3/26* | (2006.01) |
| *B32B 3/30* | (2006.01) |
| *B29L 31/30* | (2006.01) |
| *B23K 101/18* | (2006.01) |
| *B23K 103/16* | (2006.01) |
| *B23K 103/00* | (2006.01) |

(52) U.S. Cl.
CPC ...... *B23K 26/0643* (2013.01); *B23K 26/0652* (2013.01); *B23K 26/0676* (2013.01); *B23K 26/082* (2015.10); *B23K 26/0853* (2013.01); *B23K 26/352* (2015.10); *B23K 26/354* (2015.10); *B23K 26/355* (2018.08); *B23K 26/3584* (2018.08); *B29C 65/48* (2013.01); *B29C 65/8215* (2013.01); *B29C 66/0246* (2013.01); *B29C 66/1122* (2013.01); *B29C 66/3032* (2013.01); *B29C 66/3034* (2013.01); *B29C 66/41* (2013.01); *B29C 66/7212* (2013.01); *B29C 66/73161* (2013.01); *B29C 66/742* (2013.01); *B29C 66/7422* (2013.01); *B32B 3/263* (2013.01); *B32B 3/266* (2013.01); *B32B 3/30* (2013.01); *C09J 5/02* (2013.01); *B23K 2101/18* (2018.08); *B23K 2103/16* (2018.08); *B23K 2103/172* (2018.08); *B23K 2103/32* (2018.08); *B23K 2103/42* (2018.08); *B29C 66/74283* (2013.01); *B29C 2791/009* (2013.01); *B29L 2031/30* (2013.01); *B29L 2031/3002* (2013.01); *B29L 2031/3076* (2013.01)

(58) Field of Classification Search
CPC .......... B23K 2103/172; B23K 2103/32; B23K 2103/42; B23K 26/0006; B23K 26/0622; B23K 26/0643; B23K 26/0652; B23K 26/0676; B23K 26/082; B23K 26/0853; B23K 26/352; B23K 26/354; B23K 26/355; B23K 26/3584; B29L 2031/30; B29L 2031/3002; B29L 2031/3076; B32B 3/263; B32B 3/266; B32B 3/30; C09J 5/02; F16B 11/006
USPC ............ 156/272.2, 272.8, 273.3, 275.7, 292; 428/98, 156, 166, 172, 173
See application file for complete search history.

(56) References Cited

U.S. PATENT DOCUMENTS

| | | | |
|---|---|---|---|
| 4,861,407 A * | 8/1989 | Volkmann | ........... B32B 38/0008 156/275.7 |
| 5,284,538 A | 2/1994 | Suzuki et al. | |
| 5,322,988 A | 6/1994 | Russell et al. | |
| 5,478,424 A | 12/1995 | Timm et al. | |
| 5,529,813 A | 6/1996 | Kobsa et al. | |
| 6,176,959 B1 * | 1/2001 | Clarke | ................... B08B 7/0042 156/272.8 |
| 6,670,222 B1 * | 12/2003 | Brodsky | ................. H01L 24/32 438/118 |
| 2010/0143744 A1 * | 6/2010 | Gupta | ............... H01L 21/02686 438/57 |
| 2011/0086204 A1 * | 4/2011 | Wohl, Jr. | ................. G02B 1/12 219/121.72 |
| 2012/0088103 A1 * | 4/2012 | Sugiura | ................. D06M 15/55 428/367 |
| 2016/0265570 A1 | 9/2016 | Sabau et al. | |

OTHER PUBLICATIONS

Galantucci et al.: "Surface treatment for adhesive-bonded joints by excimer laser." Dipartimento di Progettazione e Jroduzione Ind. le Politecnico di Bad, Viale Jopigio 182,70126 Bad, Italy.

Spadaro C, Sunseri C, and Dispenza C., The influence of the nature of the surface oxide on the adhesive fracture energy of aluminium bonded joints as measured by T-peel tests. Int J Adhes Adhes 2007;76:1441-6.

Wong RCP, Hoult AP, Kim JK, Yu TX. Improvement of adhesive bonding in aluminium alloys using a laser surface texturing process. J Mater Process Technol 1997; vol. 63, pp. 579-584.

Walters CT, Laser surface preparation for adhesive bonding II. Report No. AFRL-ML-WP-TR-2006-4139; AFRL Wright-Patterson AFB, Ohio; 2004.

C. T. Walters, S. A. Siwecki, L. R. Dosser, C. J. Kershner, R. J. Hull, and B. E. Campbell, "Laser Removal of Contaminant Films from Metal Surfaces," Proceedings of ICALEO '96, held Oct. 14-17, 1996, LIA vol. 81, p. A-95.

C. T. Walters, "Laser-Based Cleaning Processes for Solvent Replacement," Proceedings of 42nd International SAMPE Symposium and Exhibition, held May 4-8, 1997, Anaheim, CA.

Critchlow GW, Brewis DM, Emmony DC, Cottam CA. Initial investigation into the effectiveness of CO2-laser treatment of aluminium for adhesive bonding, Int J Adhes. 1995; vol. 15, pp. 233-236.

Critchlow GW, Cottam CA, Brewis DM, Emmony DC. Further studies into the effectiveness of CO2-laser treatment of metals for adhesive bonding. Int J Adhes. 1997; vol. 17, pp. 143-150.

Yun IH, Kim WS, Kim K., Jung JM, Lee JJ, and Jung HT, "Highly enhanced interfacial adhesion properties of steel-polymer composites by dot-shaped surface patterning," Journal of Applied Physics, vol. 109, DOI: 10.1063/1.3567113, 2011.

Warren, C.D., and Paulauskas, F.L., "Laser Ablation Assisted Adhesive Bonding of Automotive Structural Composites," ICCM-12, Paris France, Jul. 3-9, 1999.

Hiroyuki Niino, Masashi Nakano, Shozaburo Nagano, Hideo Nitta, Keisuke Yano, Akira Yabe, Excimer Laser Ablation of Polymers and Carbon Fiber Composites, Journal of Photopolymer Science and Technology, vol. 3 (1990), pp. 53-56.

P. Molitor, V. Barron,T. Young, Surface treatment of titanium for adhesive bonding to polymer composites: a review International Journal of Adhesion and Adhesives, vol. 21, Issue 2, 2001, pp. 129-136.

Q. Bénard, M. Fois, M. Grisel, P. Laurens, Surface treatment of carbon/epoxy and glass/epoxy composites with an excimer laser beam, International Journal of Adhesion and Adhesives, vol. 26, Issue 7, Oct. 2006, pp. 543-549.

Belcher, M. A.; Wohl, C. J.; Hopkins, J. W.; Connell, J. W., Laser Surface Preparation and Bonding of Aerospace Structural Composites, SAMPE 2010 Conference; May 17-20, 2010; Seattle, WA; United States.

Belcher, M. A.; List, M.S., Wohl, C. J.; Ghose S., Watson, K.A., Hopkins, J. W.; Connell, J. W., Laser Surface Preparation for Adhesive Bonding of Ti-6Al-4V, SAMPE 2010; May 17-20, 2010; Seattle, WA; United States.

C. Daniel, F. Miicklich, Z. Liu, Periodical micro-nano-structuring of metallic surfaces by interfering laser beams, Appl. Surf. Sci. 208-209 (2003) 317-321.

(56) References Cited

OTHER PUBLICATIONS

C. Daniel, F. Miicklich, Quantification of periodical surface structures by white light interferometry, Prakt. Metallogr. 41 (2004) 6, 277-285 (Invited).
F. Miicklich, C. Daniel, A. Lasagni, F. Yu, Direct Surface Patterning Induced by Interfering Laser Beams, Mat. Res. Soc. Symp. Proc. vol. EXS-2 (2004) M11.1.
C. F. Miicklich, A. Lasagni, C. Daniel, Laser Interference Metallurgy—Periodic Surface Patterning and Formation of Intermetallics, Intermetallics 13 (2005) 3-4, 437-442.
C. Daniel, F. Miicklich, Micro-structural characterization of laser interference irradiated Ni—Al multi-films, Appl. Surf. Sci. 242 (2005) 140-146.
F. Miicklich, A. Lasagni, C. Daniel, Laser Interference Metallurgy—using interference as a tool for micro/nano structuring, Int. J. Mater. Res. 97 (2006) 10, 1337-1344 (featured on cover and Werner Koster Prize 2007).
C. Daniel, Biomimetic structures for mechanical applications by interfering laser beams—more than only holographic gratings, J. Mater. Res. 21 (2006) 2098-2105.
C. Daniel, N. B. Dahotre, Phase-Modulated Hierarchical Surface Structures by Interfering Laser Beams, Adv. Eng. Mater. Adv. Eng. Mater. 10 (2006) 8, 925-932.
C. Daniel, A. Lasagni, F. Miicklich, Stress and texture evolution of Ni/Al multi-film by laser interference irradiation, Surf. Coat. Technol. 180-181 (2004) 478-482.
Galantucci, LM; Gravina, A; Chita, G; Cinquepalmi, M, Surface treatment foradhesive-bonded joints by excimer laser, Composites Part A—Appl. Sci. andManuf., vol. 27, pp. 1041-1049, 1996.
Benard, Q.; Fois, M.; Grisel, M.; Laurens, P.; Joubert, F., Influence of the Polymer Surface Layer on the Adhesion of Polymer Matrix Composites, J. of Thermoplastic Comp. Mat., vol. 22, pp. 51-61, 2009.
Warren, C.D., Paulauskas, F.L., and Bowman, R.G., "Laser Ablation Assisted Adhesive Bonding of Automotive Structural Composites," ORNL/CP-102637, ICCM-12, Paris France, Jul. 3-9, 1999.
Lima, M. S. F.; Sakamoto, J. M. S.; Simoes, J. G. A.; Riva, R., Laser processing of carbon fiber reinforced polymer composite for optical fiber guidelines, Lasers In Manufacturing (2013).
Physics Procedia, Ed. by Emmelmann C; Zaeh MF; Graf T; Schmidt M, vol. 41, pp. 565-573, 2013.
Golru, S. Sharifi; Attar, M. M.; Ramezanzadeh, B., Effects of surface treatment of aluminium alloy 1050 on the adhesion and anticorrosion properties of the epoxy coating, Applied Surface Science, vol. 345, pp. 360-368, 2015.
Berger J,Holthaus MG, Pistillo N, Roch T, Rezwan K, and Lasagni AF, Appl Surf Sci 2011; vol. 257, pp. 3081-3087.
McDaniel C, Gladkovskaya O, Flanagan A, Rochev Y, and O'Connor GM, RSC Advances 2015; vol. 5, pp. 42548 42558.
Jeong Y-H, Choe H-C, Brantley WA, Thin Soild Films 2011; vol. 519, pp. 4668-4675.
Sabau A.S., C.D. Warren, Chen, J. Daniel C., D. Erdman, H. Meyer, T.R. Watkins, T. Skszeck, M.M. Caruso, and J. Staagaard, Presentation of project LM097 to the Annual Merit Review of the Vehicle Technology of DOE.
Lasagni, M. D'Alessandria, R. Giovanelli, and F. Mucklich, Advanced design of periodical architectures in bulk metals by means of Laser Interference Metallurgy, Applied Surface Science, vol. 254, 2007, pp. 930-936.
Costil S, Lamraoui A, Langlade C, Heintz O, and Oltra R, Appl Surf Sci 2014; vol. 288, pp. 542-549.
Galantucci et al.: "Surface treatment for adhesive-bonded joints by excimer laser." Dipartimento di Progettazione e Produzione Ind. le Politecnico di Bari, Viale Jopigio 182,70126 Bari, Italy.

\* cited by examiner

LASER NANOSTRUCTURED SURFACE PREPARATION FOR JOINING MATERIALS

CROSS REFERENCE TO RELATED APPLICATIONS

This application is a divisional of U.S. Non-provisional patent application Ser. No. 14/733,395 filed on Jun. 8, 2015, titled "LASER NANOSTRUCTURED SURFACE PREPARATION FOR JOINING MATERIALS", which claims priority to U.S. Provisional Patent Application No. 62/132,296, filed Mar. 12, 2015, titled "LASER NANOSTRUCTURED PREPARATION FOR JOINING DISSIMILAR MATERIALS", the contents of which are both incorporated herein by reference in their entireties.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to the joining of materials with adhesives, surface preparation for joining materials with adhesives, and to materials joined with adhesives.

BACKGROUND OF THE INVENTION

The increasing use of Carbon Fiber Polymer Composite (CFPC) as a lightweight material in automotive and aerospace industries requires more effective and reliable joining techniques. The surface treatment is a critical step governing the quality of adhesive bonded joints. Traditional surface preparation methods of composite surfaces leave a resin-rich surface layer on the composite, which is susceptible to the nucleation of cracks that may limit its structural integrity. The CFPC surface also contains chemicals, such as mold releases and contaminants, which often require removal prior to adhesive bonding. Current state-of-the art surface preparation for composites is typically accomplished through multiple mechanical/chemical processes, which lack the speed and repeatability needed for high-throughput manufacturing. They also involve chemicals that often require special handling. Many adhesive suppliers formulate adhesives to accommodate less than ideal surfaces, at the expense of structural performance.

Aluminum (Al) surfaces contain oxides and lubricant oils that are detrimental to the adhesive joining. Surface treatments aim at modifying the Al surface to attain contaminant removal, wettability with either primer or adhesive, and highly roughened surfaces. Traditional surface preparation techniques for Al used in the industry for bonding aluminum include grit blasting, solvent wiping followed by abrading (with a ScotchBrite® pad), or anodization. The first two are more common, whereas anodization is more commonly seen in aerospace applications where this more expensive and rigorous preparation is necessary to meet stringent specifications. Due to the inherent variability in grit blasting or abrasion techniques, a more controlled process would be desired.

Surface preparation is one of the main challenges for bonding CFPC with Al, both in consistent quality and productivity. The major roadblocks in joining CFPC and Al is related to the inherent poor mechanical strength of the resin, as the adhesive does not directly contact the CFPC but the resin rich layer on the CFPC surface. Moreover, the Al surface may be too smooth to allow an excellent mechanical bonding with the adhesive. Additionally, the surfaces of both materials as noted contain contaminates, which are residual from their forming/molding operations. Aluminum surfaces contain oxides and lubricant oils. Composites contain mold releases. Traditional preparation of CFPC surfaces often include chemical removal of mold releases and other handling aids but, even under the most ideal scenarios, still leaves a resin rich surface layer on the composite which is susceptible to Mode I fracture sensitivity.

To date, joining CFPCs and metal components, made of aluminum 5000, 6000, or 7000 series, titanium, magnesium, and steels is made by simply overwrapping the CFPC composite over the aluminum or using specially formulated adhesives coupled with extensive surface preparation techniques. These processes are empirical, employing several steps, such as labor-intensive surface preparation methods that are incompatible with the degree of automation required in automotive applications. In addition to the cost and floor space requirements, manual surface preparation introduces a significant variability in the overall joint integrity. The technique is not limited only to aluminum but to any metal, although Al and CFPC materials are common in the automotive and aerospace industries.

The use of one-beam laser for serial structuring, which can produce one geometrical feature per laser spot or line raster, has been used in last two decades for CFPC. Niino et al. [H. Niino, M. Nakano, S. Nagano, H. Nitta, K. Yano, A. Yabe, Excimer Laser Ablation of Polymers and Carbon Fiber Composites, Journal of Photo polymer Science and Technology, Vol. 3 (1990), pp. 53-56.] used a 308 nm XeCl excimer laser to induce surface micromodifications onto polymers and carbon fiber composites. The use of an excimer laser treatment, selective removal of the organic matrix without any degradation of fiber reinforcements, was investigated by Galantucci et al. [Galantucci, LM; Gravina, A; Chita, G; Cinquepalmi, M, Surface treatment for adhesive-bonded joints by excimer laser, Composites Part A-Appl. Sci. and Manuf., Vol. 27, pp. 1041-1049, 1996.] and Benard et al. [Benard, Q., Foisa, M., Grisel, M., Laurens, P., Surface treatment of carbon/epoxy and glass/epoxy composites with an excimer laser beam, Int. J. of Adhesion and Adhesives, Vol. 26, pp. 543-549, 2006] [Benard, Q.; Fois, M.; Grisel, M.; Laurens, P.; Joubert, F., Influence of the Polymer Surface Layer on the Adhesion of Polymer Matrix Composites, J. of Thermoplastic Comp. Mat., Vol. 22, Pages: 51-61, 2009]. Warren et al. [Warren, C. D., Paulauskas, F. L., and Bowman, R. G., "Laser Ablation Assisted Adhesive Bonding of Automotive Structural Composites," ORNL/CP-102637, ICCM-12, Paris France, Jul. 3-9 (1999)] also used a KrF excimer laser to process glass fiber-reinforced polymer matrix composites. Significant glass fiber damage was found due to the ablation process, as the glass fibers acted as a lens focusing the laser energy to the backside of the fibers and thus produced microgrooving of the fiber along the side of the fiber farthest away from the incident direction. Lima et al. [Lima, M. S. F.; Sakamoto, J. M. S.; Simoes, J. G. A.; Riva, R., Laser processing of carbon fiber reinforced polymer composite for optical fiber guidelines, Lasers In Manufacturing (LIM 2013), Physics Procedia, Ed. by Emmelmann C; Zaeh M F; Graf T; Schmidt M, Vol. 41, pp. 565-573, 2013] used a 20 W of a Nd:YAG pulsed laser to producing fiber optical guidelines in carbon fiber reinforced polymer (CFRP) composites using laser texturing and machining. The size of laser-created surface patterns is identical to the laser spot size. Detrimental microcracks can be propagated into the subsurface level.

SUMMARY OF THE INVENTION

A joined article includes a first component having a laser-treated surface portion and a second component having a laser-treated surface portion. An adhesive joins the first component to the second component at the treated surface portion.

The laser-treated surface portions can include features comprising at least one selected from the group consisting of depressions, channels and holes. The features can have a periodicity. The periodicity can be between 0.5-50 μm. The periodicity can in one aspect vary by no more than ±5%.

The laser can be a multiple-beam interference laser, wherein an original laser beam is split into at least 2 beams which are then refocused over the same spot on the component surface.

The joined article treated according to the invention can have a tensile strength that is at least 10% greater than a baseline tensile strength of an untreated article. The joined article treated according to the invention can have a ductility that is at least 100% greater than a baseline joint of an untreated article.

The laser-treated surface portion of the first component and the laser-treated portion of the second component can be dissimilar materials. One of the laser-treated surface portions can include a carbon fiber material having carbon fibers embedded in resin. A surface portion of the resin can be removed by the laser treatment to expose carbon fibers. The carbon fibers can have laser-created features formed therein.

A method of making a joined article from components can include the steps of treating a surface of a first component with a laser to create a treated surface portion, and treating a surface of a second component with a laser to create a treated surface portion. An adhesive is applied between the treated surface portion of the first component and the treated surface portion of the second component. The treated surface portion of the first component is joined to the treated surface portion of the second component.

The laser-treated surface portions comprise spots can include at least one of depressions, holes and channels. The method spots can have a periodicity. The periodicity can be between 0.5-50 μm. The periodicity can vary by no more than ±5%.

The method can include the use of an interference laser. The laser-treated surface portion of the first component and the laser-treated portion of the second component can be dissimilar materials.

The laser treating can include between 1-50 laser pulses per spot. The laser treating can include laser-component translation with speeds between 1 to 500 mm/s. The wavelength of the laser light can be 180-2000 nm.

A system for joining articles having at least first and second components can include an interference laser, wherein an original laser beam is split into at least 2 beams which are then refocused over the same spot on the component surface. A support can be provided for rigidly fixturing each of two or more components to be joined, and for registering the position of the first component and subsequent components relative to the laser. A drive is provided for moving at least one of the laser and the component supports relative to each other to apply features to a surface portion of each component.

The system can further include a device for cleaning the surfaces of each component prior to adhesive application. The device can be a blower for blowing air over the laser processed component surface.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
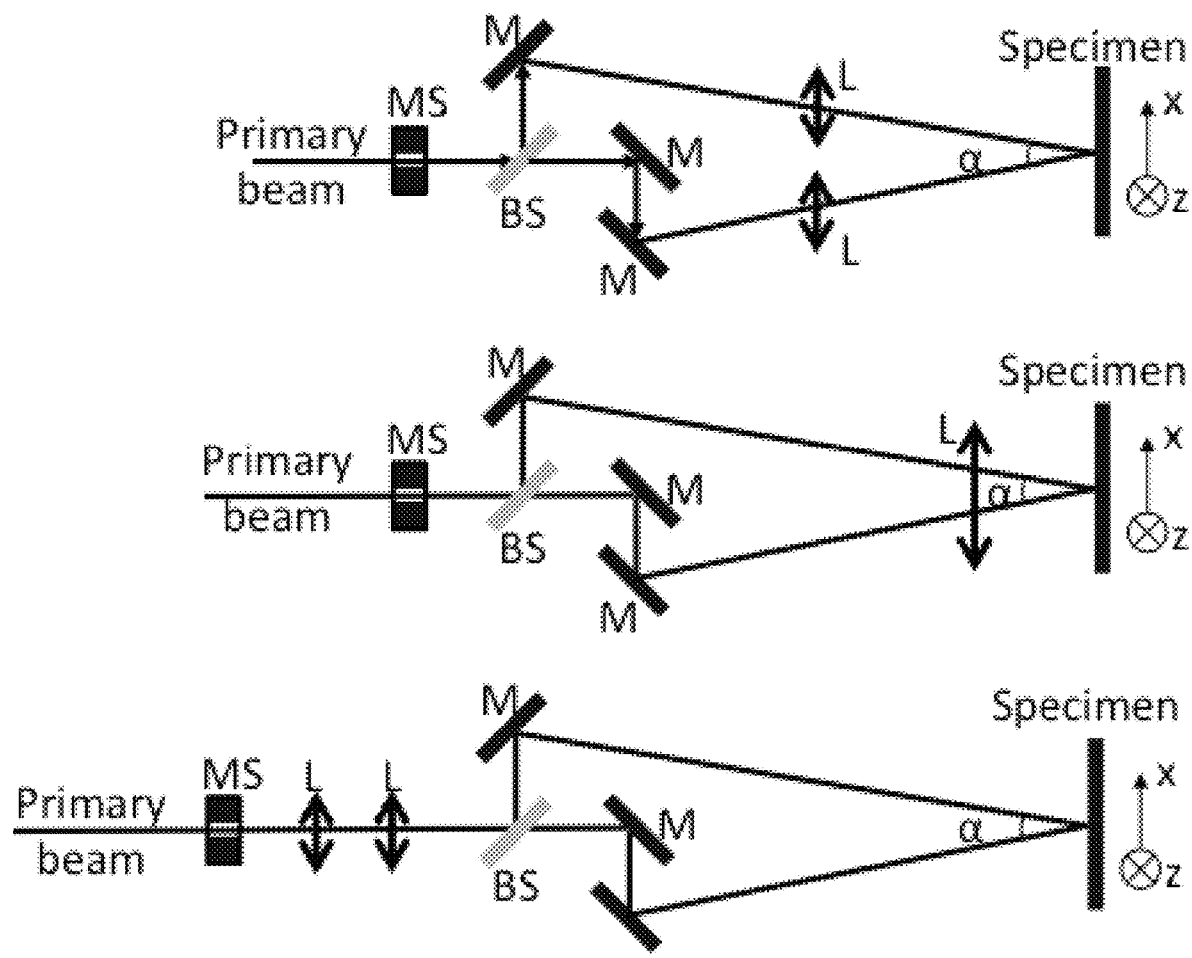
FIG. 1 is a schematic diagram for the optical setup for two-beam interference.

A joined article includes a first component having a laser-treated surface portion and a second component having a laser-treated surface portion. An adhesive joins the first component to the second component at the treated surface portion. The laser-treated surface portions can include features comprising depressions, channels or holes. The features can have a periodicity. The laser-treated surface portion of the first component and the laser-treated portion of the second component can be dissimilar materials.

The laser can be a multiple-beam interference laser, wherein an original laser beam is split into at least 2 beams, which are then refocused over the same spot on the component surface. The laser beam can be split into 3 or more beams.

The laser-treated surface portions can include features or spots comprising depressions. The spots can have a periodicity. The periodicity can be well defined by the wavelength ($\lambda$) and the angle ($\alpha$) between two beams:

$$d = \frac{\lambda}{2\sin(\alpha/2)}$$

The periodicity can be between 0.5-50 µm. The periodicity can vary by no more than ±5%. The laser patterns can be dot-, line-, and ring shaped.

The laser treating can include between 1-50 laser pulses per spot. The laser treating can include laser-component translation or rastering with speeds between 1 to 500 mm/s. The wavelength of the laser light can be 180-2000 nm. The pulse duration can be between 10 fs-10 ns. The average power of the laser can be between 0.1-3,000 W.

For example, with only 10 ns the laser pulse duration is very short, creating an extremely high peak power above 100 MW, resulting in greater than $10^{12}$K/s heating rates on a nickel/aluminum composite structure with a photothermal response. Materials showing a photochemical response ablate with minor temperature increase. Laser intensity, wavelength and pulse patterns can be tuned to achieve the optimum surface texture based on crack arrest criteria for preventing interfacial crack growth along the adhesive/aluminum interface.

The invention is useful for joining metals, carbonaceous materials, polymeric materials, and ceramics. Examples of suitable metals include aluminum, titanium, magnesium, steels, and alloys thereof. Examples of carbonaceous materials include CFPCs, as well as other compound materials where a laser ablatable first material such as a resin has embedded therein a reinforcing or other material-property modifying second material that is resistant to laser ablation, such as carbon fiber and glass fiber. Examples of suitable ceramic materials include silicon carbide, hydroxyapatite, and alumina.

The laser-treated surface portion of the first component and the laser-treated portion of the second component can be dissimilar materials. One of the laser-treated surface portions can include a CFPC material having carbon fibers embedded in resin. A surface portion of the resin can be removed by the laser treatment. The laser treatment can also produce laser-created features in the carbon fibers.

The CFPC surface can be prepared by selectively ablating the resin rich surface layer and also ablating, to a predetermined depth, the resin in the top fiber layers of the composite. The ablation depth can be between 3-50 µm. Laser intensity and wavelength can be tuned to remove resin without damaging the fibers. Thus, the untreated sharp adhesive/resin rich interface of the CFPC is replaced by a rough, fiber-reinforced interface through which the adhesive would bond more effectively. Additionally, the method of the invention will clean contaminants such as mold release agents, lubricant oils and oxides from the surface. After the laser scanning of contacting surfaces, CFPC composites would be joined to the opposing surface of the second component using an adhesive, interlocking the materials to form a joint between the CFPC of the first component and other material, for example aluminum, of the second component.

The adhesive can be any suitable adhesive. Suitable adhesives include those based on epoxy, polyurethane, and acrylic, which are commonly used in the industry.

The joined article treated according to the invention can have: (a) a tensile strength that is at least 10% greater than a baseline tensile strength of an untreated article, and/or (b) have an 100% increase in ductility, i.e., a 100% increase in the displacement at failure during shear-lap testing.

Figure 2:
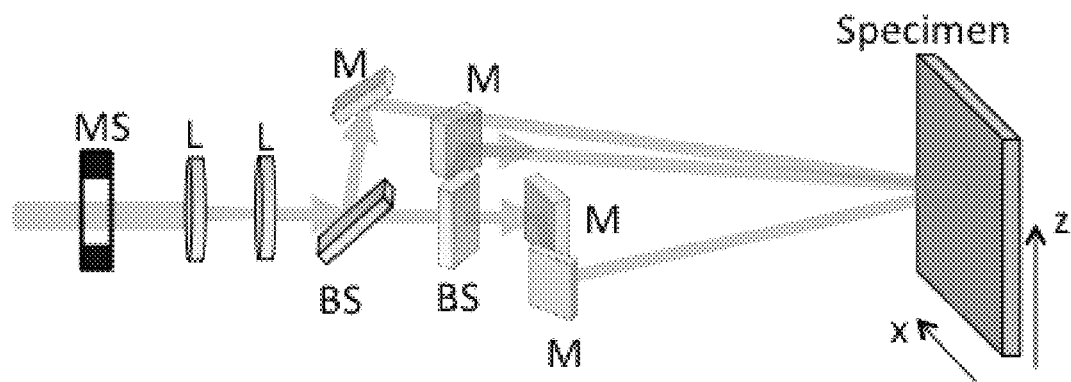
FIG. 2 is a schematic diagram for the optical setup for three-beam interference.

FIG. 1 is a schematic depiction of three alternative optical setups for the two-beam interference. The optical components are: MS—mechanical shutter, BS—beam splitter, M—mirror, and L—lens. FIG. 2 is a schematic depiction of the optical setup for the multiple-beam interference.

Figure 3:
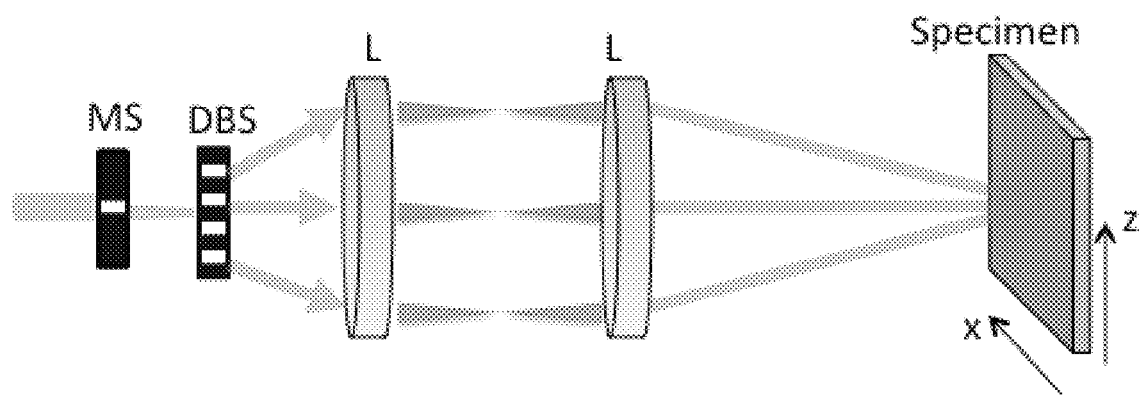
FIG. 3 is a schematic diagram for an alternative optical setup for three or more beams interference.

FIG. 3 is a schematic depiction of the optical setup for a femtosecond laser in which the interference patterns were produced using a diffractive beam splitter (DBS) and confocal imaging system with two convex lenses.

Figure 4:
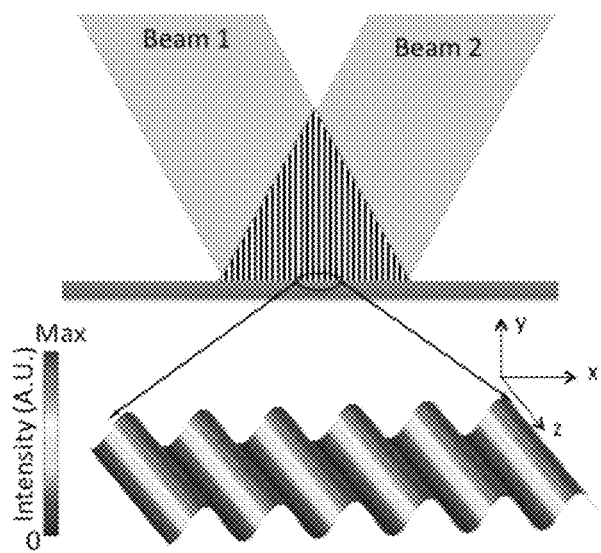
FIG. 4 is a schematic diagram of the alternating high-power and low-power profile created by wave interference for two-beam interference.
Figure 5:
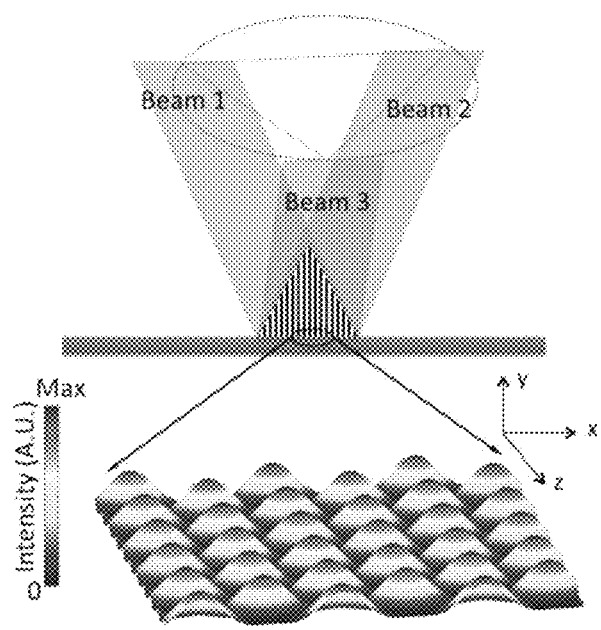
FIG. 5 is a schematic diagram of the alternating high-power and low-power profile created by wave interference for three or more beams interference.

FIG. 4 illustrates the alternating, high-power and low-power profile created by 2-beam wave interference, which yields localized melting and surface structuring. FIG. 5 illustrates the alternating, high-power and low-power profile created by multiple-beam wave interference (more than 3 beams), which yields localized melting and surface structuring.

Figure 6:
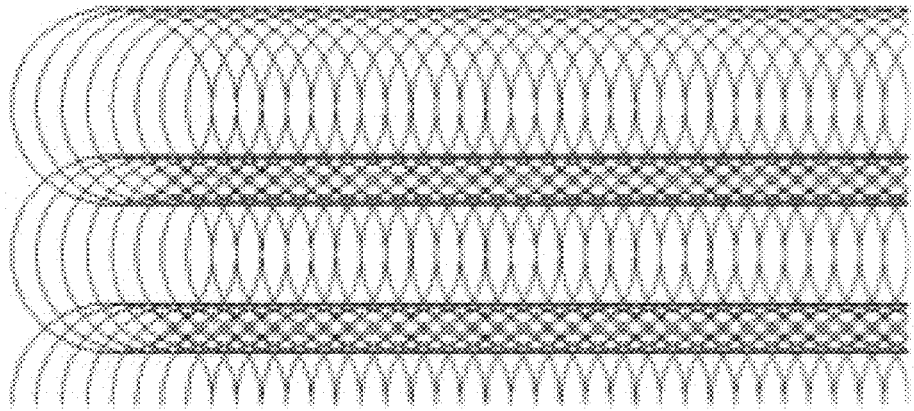
FIG. 6 is a schematic diagram of a laser spot profile for a rastering mode with 5 mm/s rastering speed.
Figure 7:
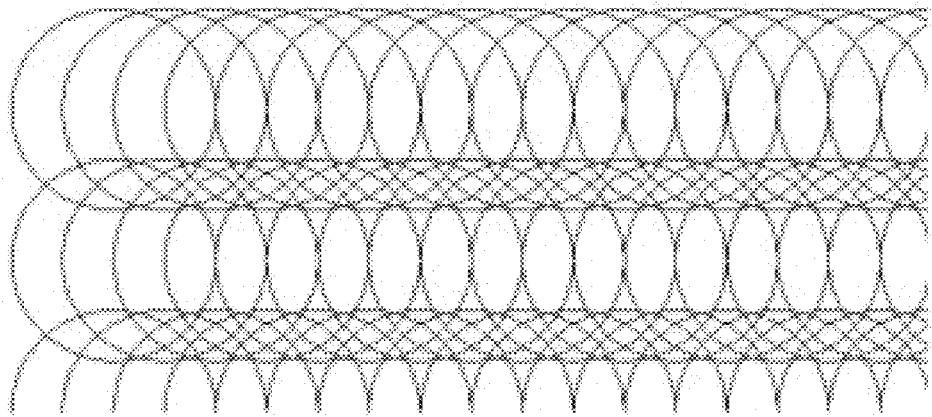
FIG. 7 is a schematic diagram of a laser spot profile for a rastering mode with 10 mm/s rastering speed.
Figure 8:
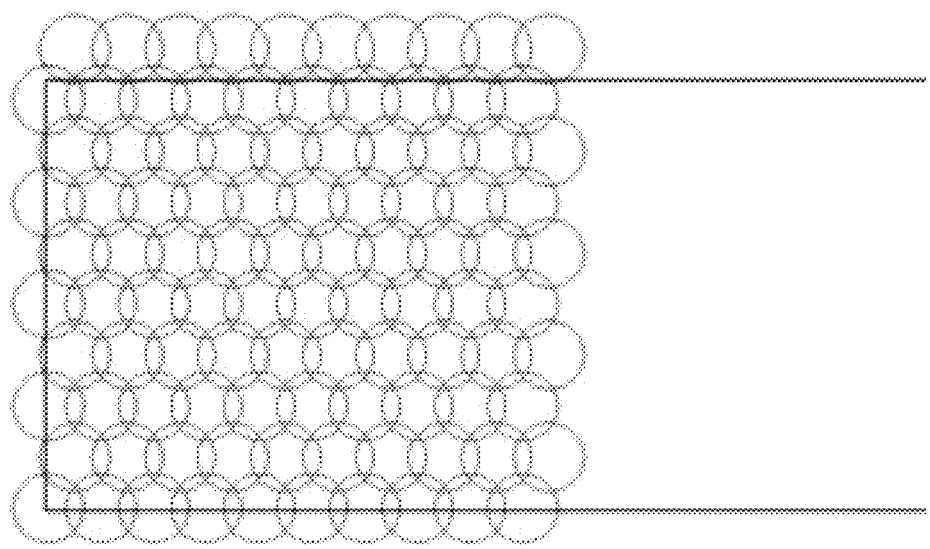
FIG. 8 is a schematic diagram of a laser spot profile for a spot-by-spot mode with a beam size of 4 mm covering an area of 25×25 mm.
Figure 9:
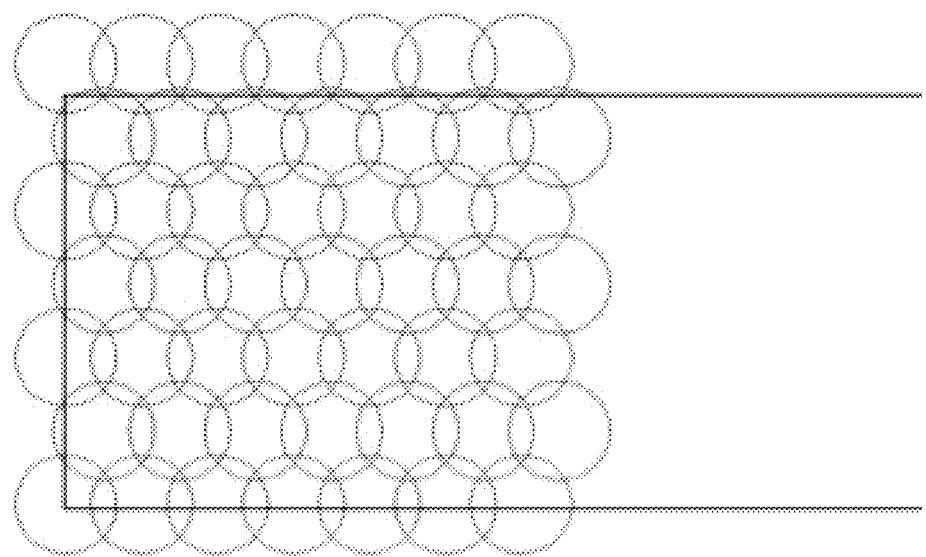
FIG. 9 is a schematic diagram of a laser spot profile for a spot-by-spot mode with a beam size of 6 mm covering an area of 25×25 mm.

FIGS. 6-9 are schematic illustrations of the laser spots for a 25×25 mm coverage area. FIG. 6 is a depiction of features or spots created by a 5 mm/s rastering speed. FIG. 7 is a depiction of the feature pattern for a 10 mm/s rastering speed. The overlap distance of rows in FIGS. 6-7 is 1 mm. FIG. 8 is a depiction of the feature pattern created by the laser in spot-by-spot mode with a beam size of 4 mm. FIG. 9 is a depiction of the feature pattern created by the laser in spot-by-spot mode with a beam size of 6 mm.

Figure 10:
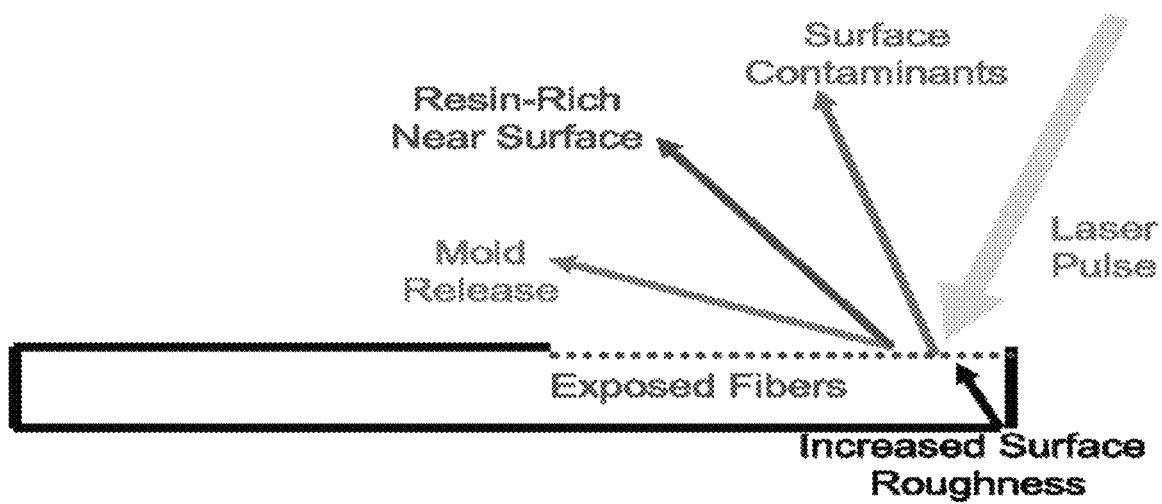
FIG. 10 is a schematic diagram illustrating the effect of the invention on a carbon fiber polymer composite.
Figure 11:
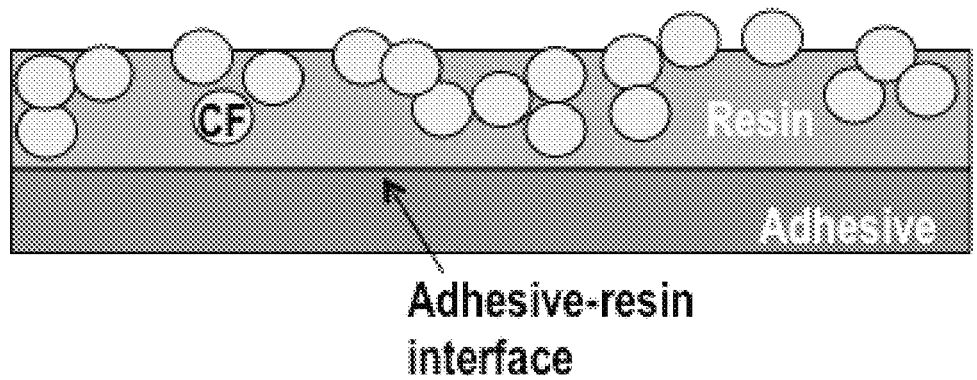
FIG. 11 is a schematic diagram of the adhesive-resin interface for a carbon fiber polymer composite without laser structuring.
Figure 12:
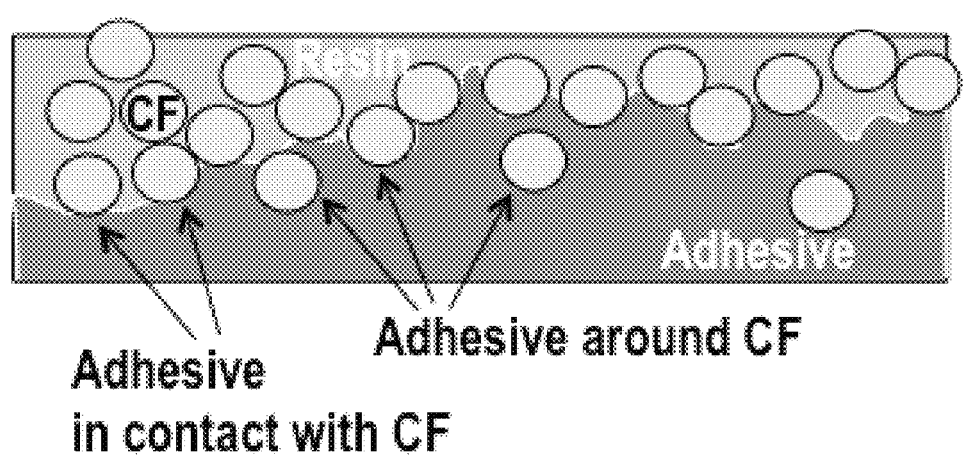
FIG. 12 is a schematic diagram of the adhesive-resin interface for a carbon fiber polymer composite with laser structuring at 2 shots per spot.
Figure 13A:
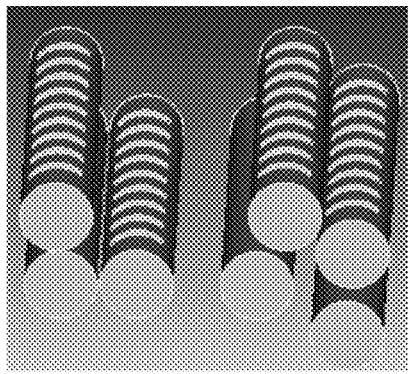
FIGS. 13 A-D are schematic diagrams illustrating the laser structuring of carbon fibers where A) is a perspective view; B) is a side view; C) is a top view; and D) is a vertical cross section through a vertical carbon fiber.
Figure 13B:
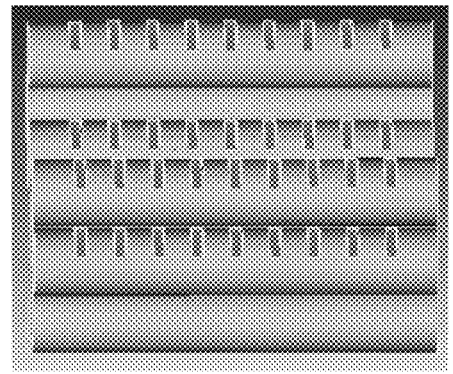
Figure 13C:
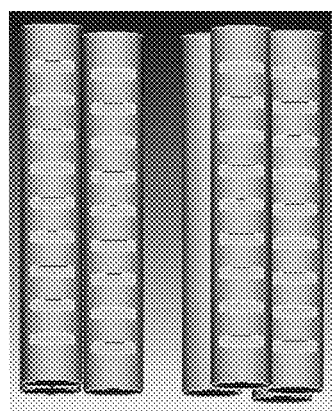
Figure 13D:
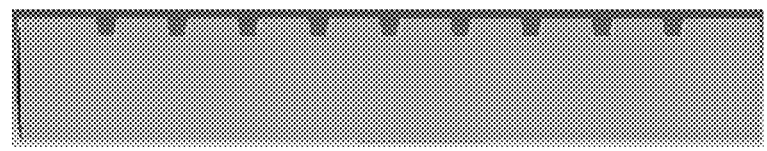

The optical micrographs of laser ablated CFPC specimens show that carbon fibers are directly exposed on both top surface and on side surfaces, creating an improved bonding surface for the adhesive. The laser structuring of CFPC addresses the prior problems related to CFPC joining with Al in which adhesive does not directly contact the CFPC but instead the resin rich layer on the CFPC and the inherent poor mechanical strength of that resin. The resin rich surface layer on the composite is also susceptible to Mode I fracture (delamination) sensitivity as the adhesive/resin interface relies only upon chemical bonding and is planar in nature. FIG. 10 illustrates the expected effects due to laser-structuring of CFPC, in which the resin rich near surface is removed along with mold release agents and surface contaminants to expose the carbon fibers to the adhesive. FIG. 11 is a rendering of the adhesive-resin interface of a baseline joint without laser structuring, and FIG. 12 illustrates the adhesive-resin interface of a joint in which the CFPC was laser-structured with 2 shots per spot. The adhesive directly contacts and engages the roughened surface created by the exposed carbon fibers.

FIG. 13 illustrates the laser structuring of the carbon fibers themselves. FIG. 13A illustrates a fiber arrangement in which the carbon fibers at the surface are structured and those behind them are not structured. FIG. 13B is a side view illustrating the depth of the features relative to the fibers. FIG. 13C is a top view of the carbon fiber surface that is exposed to the adhesive. FIG. 13D is cross-section through a carbon fiber showing the periodic structuring. The depth of the grooves can be varied by increasing the laser power, and the periodicity can be changed by varying the angles between the beams.

Figure 14:
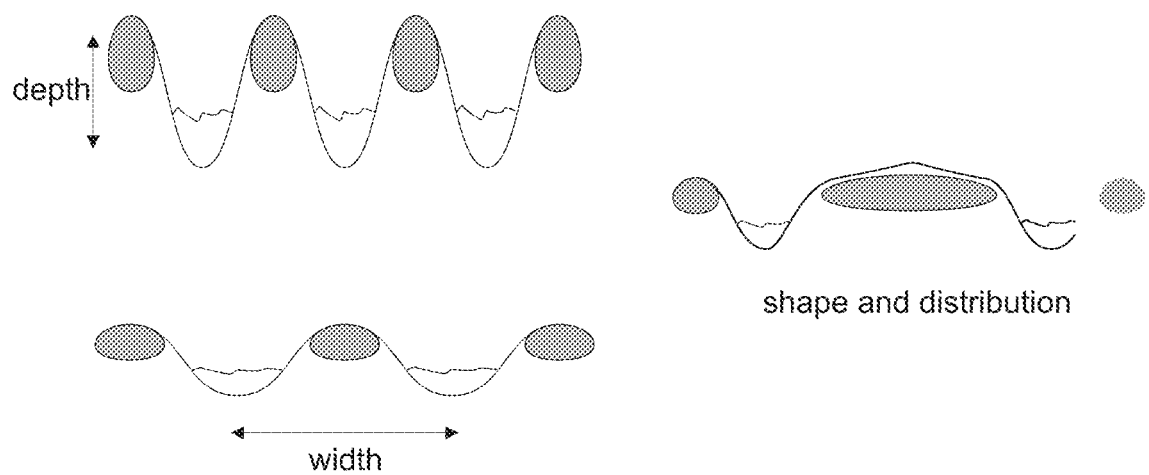
FIG. 14 is a schematic diagram of the expected surface morphology induced through the laser-structuring of Al.

FIG. 14 is a schematic depiction of the expected surface morphology/topology induced through laser-structuring of Al. The shape including the aspect ratio, the periodicity and the distribution of the features can vary.

Figure 15A:
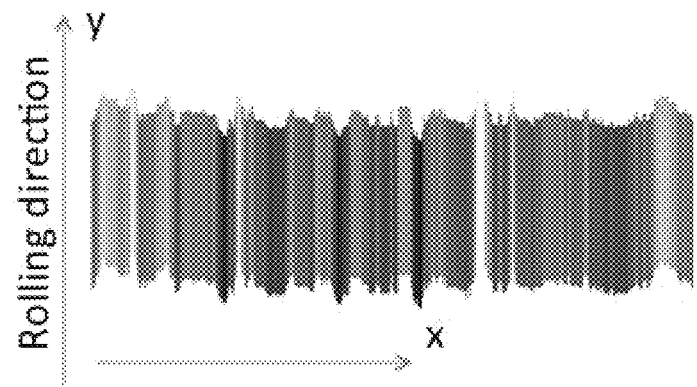
FIGS. 15 A-C are schematic diagrams of surface profiles of A) unprocessed aluminum; B) aluminum processed using a 2 beam laser interference; and C) a cross section of the aluminum taken along line A-A of FIG. 15 B).
Figure 15B:
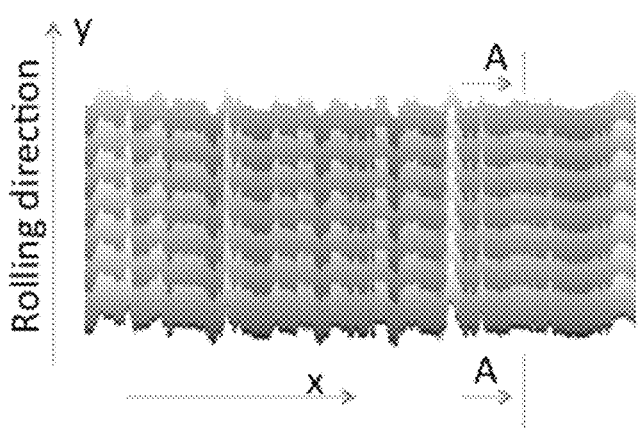
Figure 15C:
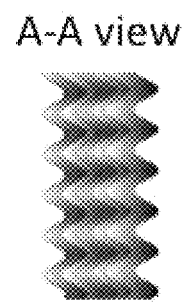

FIG. 15 is a schematic depiction of 3-D surface profiles of an aluminum surface. FIG. 15A is a depiction of an as-received unprocessed aluminum surface. FIG. 15B and FIG. 15C are schematic depictions of a laser structured aluminum surface using a 2 beam laser interference technique with 10 pulses.

Figure 16:
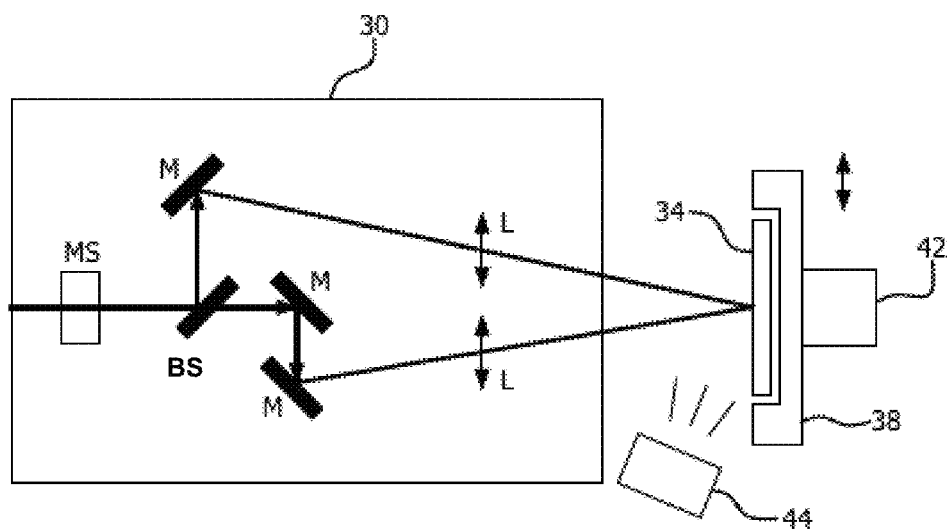
FIG. 16 is a schematic diagram of a system for joining articles according to the invention.

A system for joining articles having at least first and second components is shown in FIG. 16. The system can include an interference laser 30, wherein an original laser beam is split into at least 2 beams, which are then refocused over the same spot on the component surface 34. A support 38 is provided for rigidly fixturing each of two or more components to be joined, and for registering the position of the first component and subsequent components relative to the laser 30. A drive 42 is provided for moving at least one of the laser 30 and the component support 38 relative to each other to apply features to a surface portion of each component. The system can further include a device for cleaning the surfaces of each component prior to adhesive application. The device can be a blower 44 for blowing air over the laser processed component surface.

Figure 17:
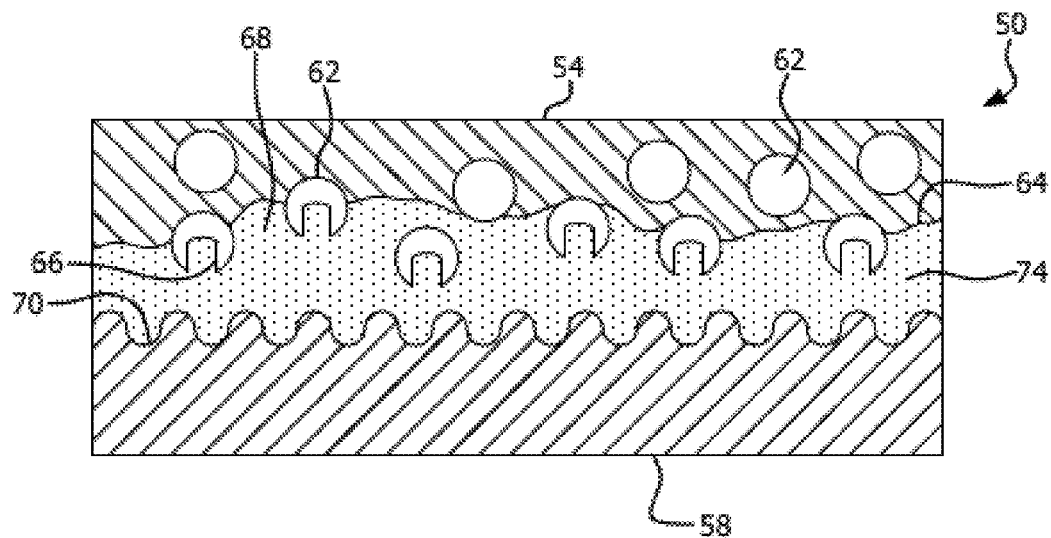
FIG. 17 is a schematic diagram of a joined article according to the invention.

A joined article 50 according to the invention is shown in FIG. 17. The article 50 includes a first component 54 and a second component 58. The first component 54 can be a CFPC in which a surface portion has been removed to expose carbon fibers 62. The carbon fibers 62 that extend from the ablated resin surface 64 can have laser-structured features 66 formed therein. Spaces 68 between the exposed carbon fibers 62 also provide features for engaging the adhesive. The second component 58 can have features 70. An adhesive 74 is interposed between the first component 54 and the second component 58 and contacts the carbon fibers 62 and feature bordering the spaces 68, and also contacts the second component 58 and features 70.

A method of making a joined article from components can include the step of treating a surface of a first component with a laser to create a treated surface portion. A surface of a second component can be treated with a laser to create a treated surface portion. An adhesive can be applied between the treated surface portion of the first component and the treated surface portion of the second component, and the treated surface portion of the first component can be joined to the treated surface portion of the second component.

Experimental Setup

Baseline joints were made without involving laser structuring by using Al and CFPC samples that were abraded using a ScotchBrite® pad and ultrasonically cleaned using ethanol. The baseline joints were used to assess the improvements in the joint strength for the joints produced with the laser-structured Al and CFPC. Both CFPC and Al specimens were laser-structured using the interference technique in as-received condition, without any additional surface preparation steps. Prior to joining, the laser-structured samples were not cleaned with any solvents. Two types of laser structuring were employed: (1) rastering, in which the laser beam was translated over the sample surface while the laser was on, and (2) spot-by-spot, in which the laser beam was held over each spot for a certain amount of time in order to allow multiple laser shots over the same area.

A 10 Hz Q-switched Nd:YAG laser (Quanta-Ray PRO 230, Spectra Physics) was used to process specimens. The pulse width was 10 ns and the beam diameter was varied from 2 to 8 mm. The fundamental emission with the wavelength of 1064 nm was transformed to 355 nm and 266 nm using non-linear crystals. The maximum laser energy per pulse was 0.35 J at 355 nm and 0.04 J at 266 nm. The number of pulses is selected by a mechanical shutter. The primary laser beam was split into two beams and guided with mirrors onto the specimen surface. The laser interference power profile was created by guiding those beams to the sample surface by overlapping each other with defined angles to each other. The coherent beams create an interference pattern instead of adding their intensity. This allows a microscopic modulation and creates a light pattern without any loss of energy during the interference process.

In some experiments, two identical focal lenses were used in each path of the splitted beam to focus laser beams from 8 mm to smaller sizes, hence increasing the laser pulse fluences. For the laser structuring of Al and CFPC nanosecond lasers, the optimum pulse fluence of the laser can be 0.2 to 3 $J/cm^2$. Periodic lines structures were formed on the surface by laser interference. The specimen was fixed on a translation stage capable of moving in horizontal and vertical directions. A LabVIEW based computer program was used to automatically control the location of the translation stage and the shutter opening time. During the experiments, the specimen attached to the translation stage was firstly moved to a predefined coordinate origin, followed by a shutter opening to transmit a certain number of laser pulses. For spot-by-spot structuring, the specimen was moved to the next position followed by another shutter opening. By repeating this procedure, an entire surface area of the specimen was processed. For the rastering mode, the shutter was open while the specimen was translated over the laser spot and laser fired shots with a 10 Hz frequency. After a horizontal line was completed, the shutter was closed and the specimen was moved to the start of the next line.

A WYKO 9100 surface profilometer was used to obtain surface roughness data for the as-received CFPC. WYKO surface profilometer systems are non-contact optical profilers that use two methods to measure a wide range of surface topographical features. Phase-shifting interferometry mode allows the measurement of smooth surfaces and small steps, while vertical scanning interferometry mode allows the measurement of rough surfaces and steps up to several mm high. The surface profile shown of the as-received CFPC exhibited some grooves on its surface, approximately 9 μm deep, which may be generated from a previous processing step such as rolling. The average roughness, or arithmetical mean deviation of the roughness profile, Ra, root-mean-square deviation of the roughness profile, Rq, and maximum height of the roughness profile, Rt, were estimated.

The examples utilize Al 5182 as one component and as the other component carbon fiber polymer composites (CFPC) made from Prepreg-T83 resin (epoxy) and T700S Carbon Fiber, supplied as 5 ply thick, 0/90° plaques from Clearwater Composites Inc. (Duluth Mich.). The dimensions of the Al samples were 1.5 mm thick, 100 mm width, and 300 mm long. The dimensions of the CFPC samples were 1.08 mm thick, 100 mm width, and 300 mm long. The diameter of one carbon fiber (CF) was approximately 6.7 µm. The adhesives that were used included DP460—an epoxy, DP620—a polyurethane, and DP810—a low-odor acrylic, all from 3M (St. Paul Minn.).

The surface roughness increased from 226 nm (as-received) to 392 nm for the laser interference structured surface of Al 5182 with 10 pulses/spot (λ=355 nm, pulse fluence of 1.2 J/cm$^2$), as shown in Table 1. The following data was obtained with an optical surface profilometer: arithmetical-mean deviation of the roughness profile (Ra), root-mean-square deviation of the roughness profile (Rq), and total height of the roughness profile (Rt). The laser-interference structuring increased the surface area that would be in contact with the adhesive.

TABLE 1

| Condition | Ra [µm] | Rq [µm] | Rt [µm] |
|---|---|---|---|
| Untreated | 0.226 | 0.286 | 3.21 |
| Laser treated | 0.391 | 0.493 | 4.68 |

Figure 18:
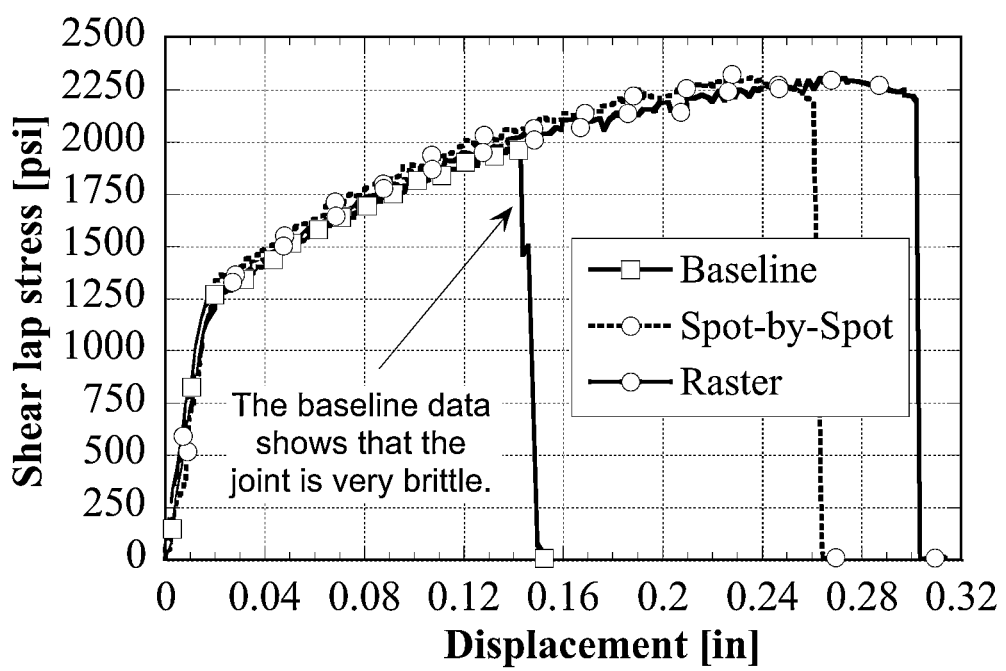
FIG. 18 is a plot of shear lap stress (psi) vs. displacement (in.) for an unstructured joint, a spot-by-spot laser-interference structure, and a laser-interference raster structure.

The results from mechanical testing on the lap shear strength are shown in FIG. 18. Shear lap stress data was obtained for Al-CFPC joints for a baseline joint (24.8× 26.65), a spot-by-spot laser-interference structured Al and CFPC (24.87×25.18), and laser-interference raster of joint surfaces (25.08×26.45). The width and the length of the actual joined area are indicated in parenthesis as (W×L) in mm. Laser-structured joints are more ductile, indicating an enhanced adhesion of adhesive to both Al and CFPC. The displacement at failure increasing from 0.145 in for the baseline joint to more than 0.26 in for the laser-structured joints. Laser structured joints can absorb approximately 50% more energy than baseline joints.

Figure 19:
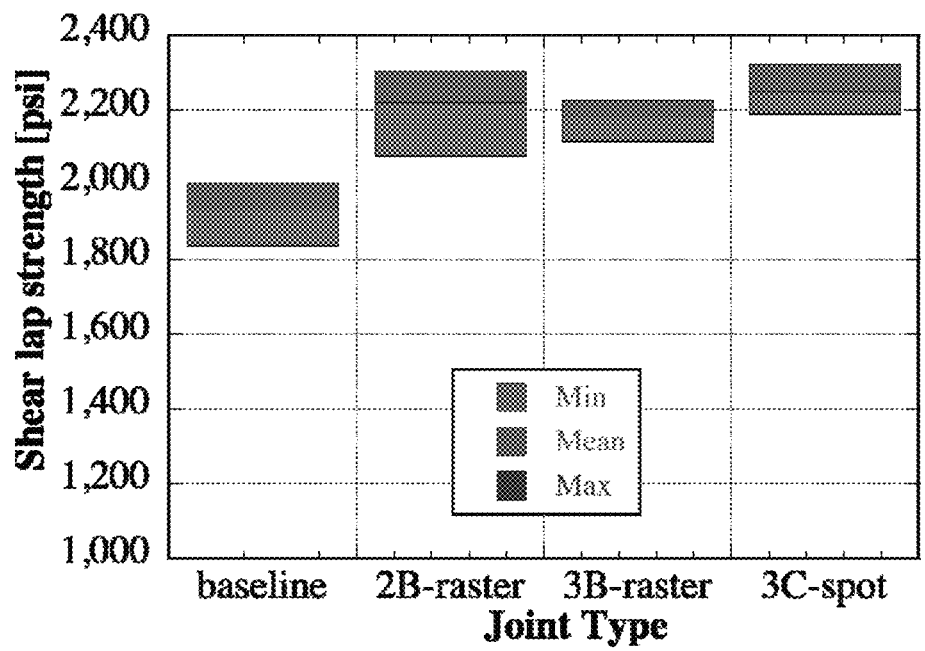
FIG. 19 is a plot of shear lap strength (psi) for differing joint types (baseline, 2B-raster, 3B-raster and 3C-spot) for a first adhesive.
Figure 20:
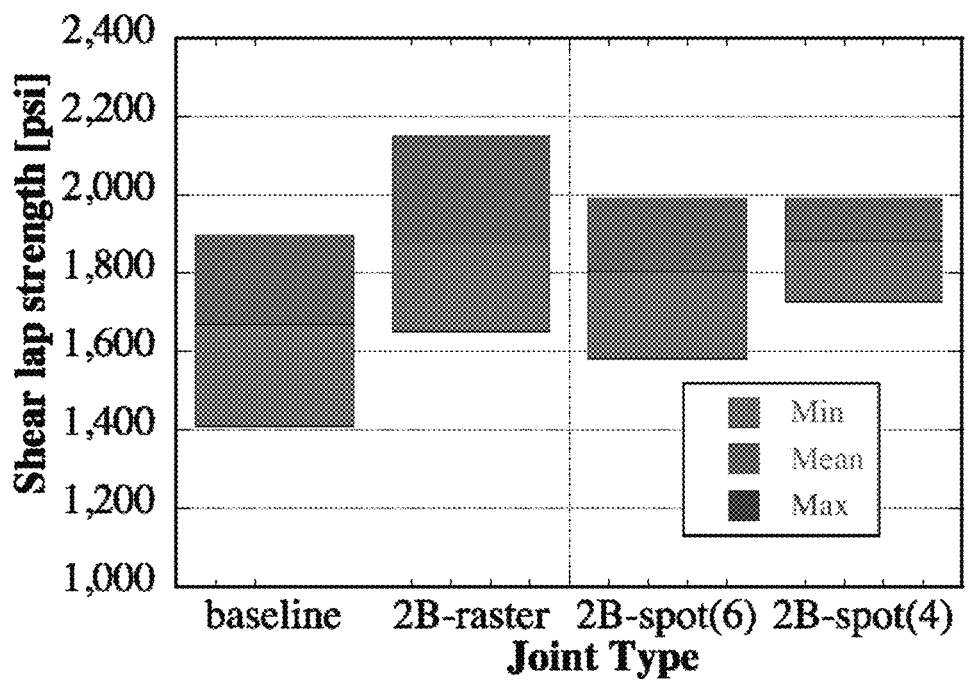
FIG. 20 is a plot of shear lap strength (psi) for differing joint types (baseline, 2B-raster, 2B-spot(6) and 2B-spot(4)) for a second adhesive.
Figure 21:
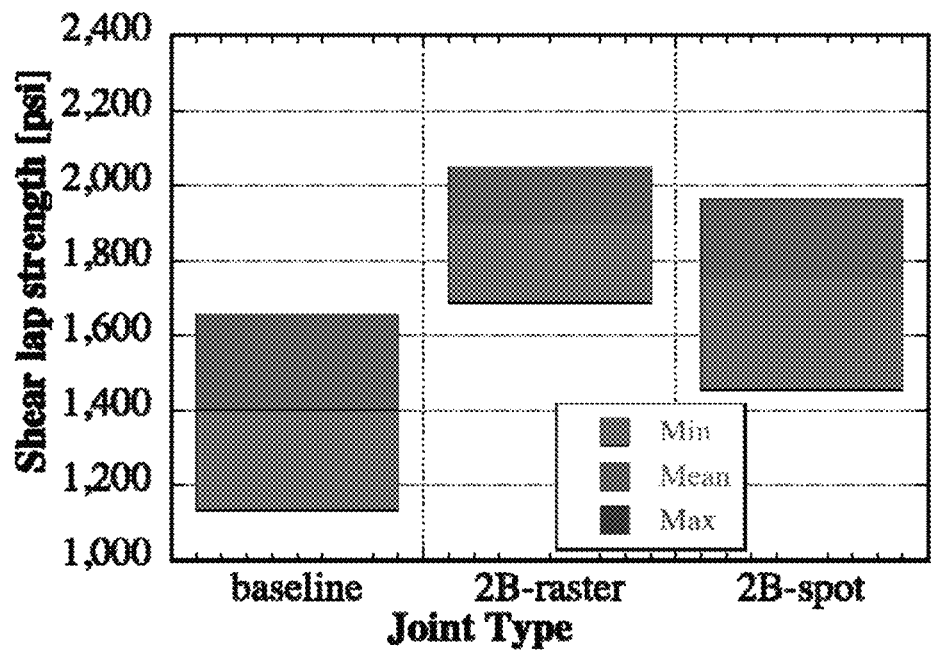
FIG. 21 is a plot of shear lap strength (psi) for differing joint types (baseline, 2B-raster, and 2B-spot) for a third adhesive.

There is shown in FIGS. 19-21 the single-lap shear strength results for minimum, mean, and maximum values for baseline and laser-interference structured surfaces for both CFPC and Al for the DP810 adhesive (FIG. 19), the DP460NS adhesive (FIG. 20), and the DP620NS adhesive (FIG. 21).

The effect of laser structuring for different adhesives was assessed with a total of sixty Al and carbon fiber polymer composite (CFPC) joints. The joints were bonded using the three adhesives, as follows: 24 joints for DP810, 18 joints for DP460, and 18 joints for DP620 (Table 2). Six joint specimens were made for each joint type to assess the effect of adhesive for laser structured surface preparation over conventional surface preparation. The conditions for laser rastering and laser spot-by-spot processing modes were selected based on a sensitivity study for DP810 adhesive. Six specimens were used for each joint type. Thus, the single-lap shear increase was not due to the variation in the bond length but solely due to laser structuring.

TABLE 2

| Adhesive | Joint Type | Preparation of CFPC | Preparation of Al |
|---|---|---|---|
| DP810 | Baseline | abraded and ethanol cleaned | abraded and ethanol cleaned |
| DP460NS | baseline | abraded and ethanol cleaned | abraded and ethanol cleaned |
| DP620NS | baseline | abraded and ethanol cleaned | abraded and ethanol cleaned |
| DP810 | 2B-raster | Laser raster #2 | Laser raster B |
| DP810 | 3B-raster | Laser raster #3 | Laser raster B |
| DP810 | 3C-spot | Laser spot-by-spot #3 | Laser spot-by-spot C |
| DP460NS | 2B-raster | Laser raster #2 | Laser raster B |
| DP460NS | 2B-spot | Laser spot-by-spot #2 | Laser spot-by-spot B |
| DP620NS | 2B-raster | Laser raster #2 | Laser raster B |
| DP620NS | 2B-spot | Laser spot-by-spot #2 | Laser spot-by-spot B |

Raster #2 indicates 5 mm/s @ 3.5 W, spot size 4 mm, and overlap between successive rows of 1 mm. Raster #3 indicates 10 mm/s @ 3.5 W, spot size 4 mm, and overlap between successive rows of 1 mm. Raster B indicates 5 mm/s @ 3.5 W, spot size 4 mm, and overlap between successive rows of 1 mm. Spot-by-spot #2 indicates 4 shots/spot @ 3.5 W, spot size 6 mm, and overlap between successive rows of 1 mm. Spot-by-spot B indicates 4 shots/spot @ 2.86 W, spot size 6 mm, and overlap between successive rows of 1 mm. Spot-by-spot C indicates 2 shots/spot @ 2.86 W, spot size 6 mm, and overlap between successive rows of 1 mm.

Figure 22:
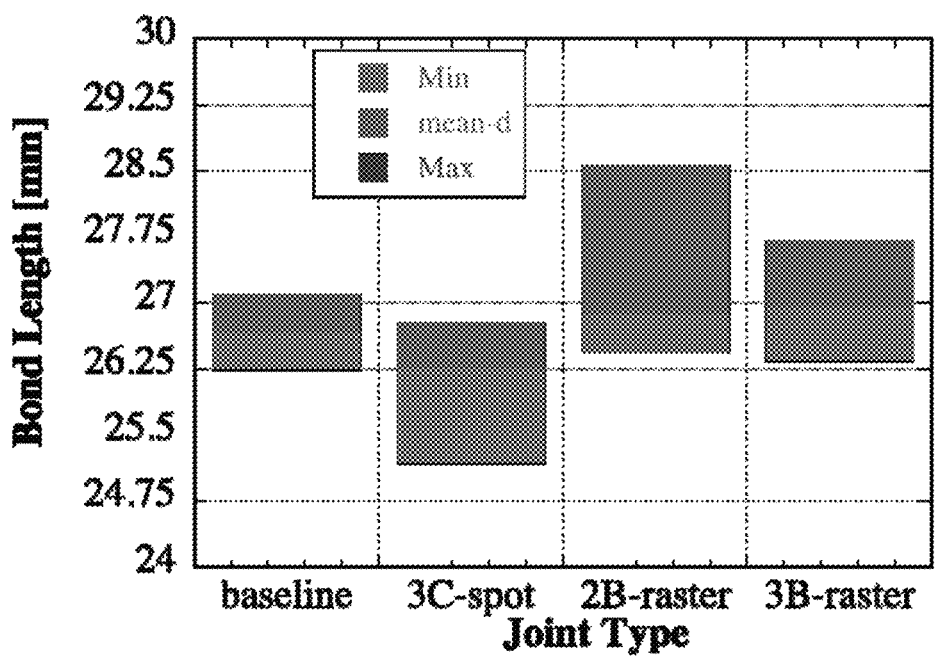
FIG. 22 is a plot of bond length (mm) for differing joint types (baseline, 3C-spot, 2B-raster and 3B-raster) for a first adhesive.
Figure 23:
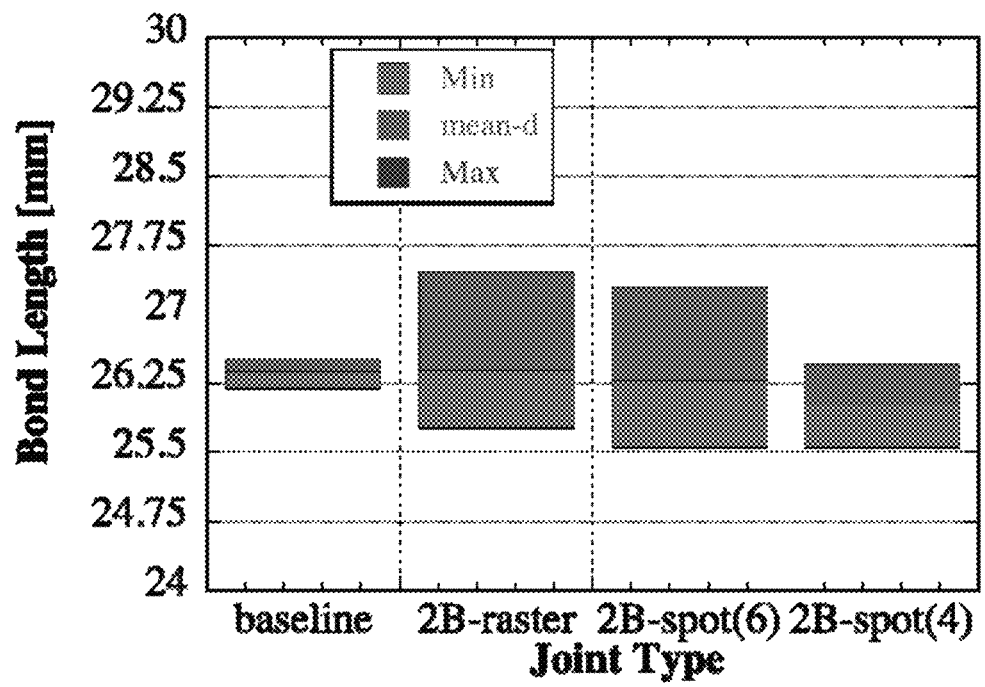
FIG. 23 is a plot of bond length (mm) for differing joint types (baseline, 2B-raster, 2B-spot(6) and 2B-spot(4)) for a second adhesive.
Figure 24:
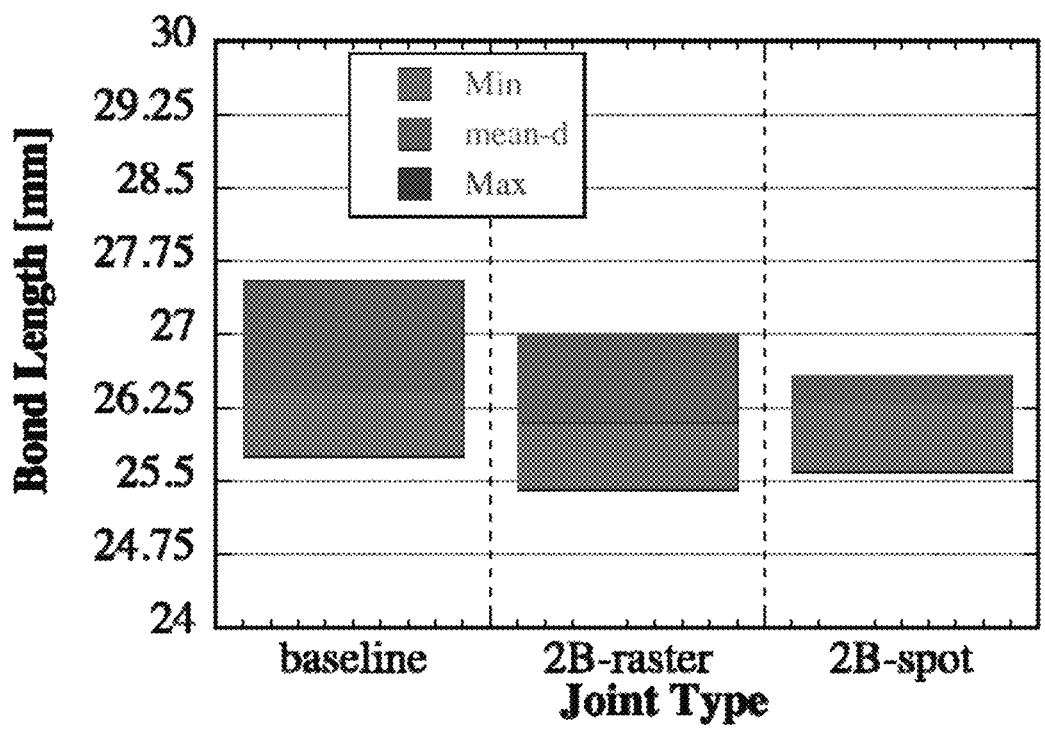
FIG. 24 is a plot of bond length (mm) for differing joint types (baseline, 2B-raster, and 2B-spot) for a third adhesive.

The bond length data shown in FIGS. 22-24 illustrate the minimum, mean, and maximum for baseline and laser-interference structured surfaces for both CFPC and Al for DP810 adhesive (FIG. 22), the DP460NS adhesive (FIG. 23), and the DP620NS adhesive (FIG. 24).

Table 3 shows the increase in mean shear-lap strength (from FIGS. 19, 20, and 21) in percentage for the laser-structured joint components with respect with their corresponding baselines. The results show that the shear-lap strength of Al-CFPC joints has increased by 12-35% using laser-interference structuring.

| Adhesive | % increase by laser-raster | % increase by laser spot-by-spot |
|---|---|---|
| 810 | 12.7-14.8 | 16.3 |
| 460NS | 12.8 | 8.2-12.8 |
| 620NS | 35.3 | 25.4 |

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the bread of the range.

This invention can be embodied in other forms without departing from the spirit or essential attributes thereof, and accordingly, reference should be had to the following claims to determine the scope of the invention.

We claim:

1. A joined article, comprising:
   a first component having an interference laser-treated surface portion;
   a second component having an interference laser-treated surface portion; and,
   an adhesive joining the first component to the second component at the interference laser-treated surface portions;
   wherein the interference laser-treated surface portions comprise ridge features, wherein the ridge features have a periodicity between 0.5-50 μm, and wherein the periodicity varies by no more than ±5%.

2. The joined article of claim 1, wherein the interference laser-treated surface portions comprise features comprising at least one selected from the group consisting of depressions, channels and holes.

3. The joined article of claim 1, wherein the interference laser is a multiple-beam interference laser, wherein an original laser beam is split into at least 2 beams which are then refocused over the same spot on the surface of each component.

4. The joined article of claim 1, wherein the joined article treated according to the invention has a tensile strength that is at least 10% greater than a baseline tensile strength of an untreated article.

5. The joined article of claim 1, wherein the joined article includes a carbon-fiber polymer composite component and has a displacement of failure that is at least 100% greater than a baseline joint of an untreated article.

6. The joined article of claim 1, wherein the interference laser-treated surface portion of the first component and the interference laser-treated portion of the second component are dissimilar materials.

7. A joined article, comprising:
   a first component having an interference laser-treated surface portion;
   a second component having an interference laser-treated surface portion; and,
   an adhesive joining the first component to the second component at the treated surface portions;
   wherein one of the interference laser-treated surface portions comprises a carbon fiber material having carbon fibers embedded in resin and partially exposed from the resin, and wherein a surface portion of the resin has been removed by the interference laser treatment, and wherein the carbon fibers comprise interference laser-created grooves.

* * * * *